United States Patent Office 3,020,231
Patented Feb. 6, 1962

3,020,231
COAGULATION
Charles E. Colwell and Robert C. Miller, Pittsburgh, Pa., assignors to Union Carbide Corporation, a corporation of New York
No Drawing. Filed Nov. 18, 1957, Ser. No. 696,928
36 Claims. (Cl. 210—54)

This invention relates to the coagulation or flocculation of solids comprising clay mineral dispersed, suspended or slurried in a liquid medium. In one aspect, this invention relates to the coagulation of metal-containing ores dispersed in a liquid medium. In another asspect, this invention relates to the coagulation of so-called phosphate slimes.

In numerous fields and industries, it is necessary for apparent and obvious reasons to coagulate or flocculate dispersed solids in a liquid medium. Among the industries or fields which can be listed as desirable of a practical and efficient means for removing the dispersed or suspended solids from liquid media are the water clarification and purification industry, mining industries employing hydraulic methods, the uranium industry, the phosphate industry, and others. Tremendous economic advantages can accrue by the effective coagulation of these troublesome solids dispersions or suspensions.

Because of the universal occurrence of clay minerals as such and the widespread occurrence of clay minerals in admixture with other minerals, it is not unexpected that one of the constituents comprising the solids content in slurries or liquid suspensions or dispersions containing these solids belongs to the class known as clays or clay minerals. The clay minerals contemplated in this invention belong to the kaolin, montmorillonite and illite or hydromica groups. Oftentimes, a fourth class is included, namely halloysite, and this class is likewise encompassed within the scope of the instant invention. Illustrative of the subgroups generally classified under one of the main groups noted above are kaolinite, bentonites, e.g., sodium, potassium, lithium, calcium and other bentonites, attapulgite, hectorite, montronite, beidellite, saponite, nacrite, fuller's earth, anauxite, dickite, nacrite, sericite, and the like. As will be shown by the very extensive data present in this application, dispersions, suspensions, or slurries (these three terms will be used interchangeably throughout) of solids comprising clay mineral in liquid media are effectively coagulated or flocculated by the addition thereto of poly(ethylene oxide) described hereinafter. For purposes of discussion in this application, the terms "coagulation" and "flocculation" are used interchangeably and apply to those systems wherein dispersed or suspended solids in a liquid medium are caused to agglomerate or coalesce thereby forming larger solid masses or flocs which usually exhibit the properties of rapid filtration and/or sedimentation.

Accordingly, one or more of the following objects will be achieved by the practice of this invention.

It is an object of this invention to provide a novel process for coagulating solids comprising clay mineral suspended in a liquid medium by the addition thereto of a coagulating amount of poly(ethylene oxide). It is another object of this invention to provide a novel process for coagulating a leached or unleached metal ore slurry by the addition thereto of a coagulating amount of poly-(ethylene oxide). A further object of this invention is to provide a novel process for coagulating an acidic or basic leached uranium ore slurry by the addition thereto of a coagulating amount of poly(ethylene oxide). A still further object of this invention is to provide a novel process for coagulating so-called phosphate slimes by the addition thereto of a coagulating amount of poly(ethylene oxide). A yet further object of this invention is to provide a novel process for coagulating an acidified slurry comprising clay mineral by the addition thereto of a coagulating amount of poly(ethylene oxide). Another object of this invention to to provide a novel process for coagulating solids comprising clay mineral having a zeta potential approximately no greater than sodium bentonite which solids are suspended in a liquid medium by adding thereto a coagulating amount of poly(ethylene oxide). Also, it is an object of this invention to provide a novel process for clarifying turbid water by the addition thereto of a coagulating amount of poly(ethylene oxide) as such, or by first adding a clay mineral to said turbid water and subsequently incorporating a coagulating amount of poly-(ethylene oxide) thereto. Another object of this invention is to provide a novel, efficient and practical coagulation process which results in the recovery of useful solid by-products, in the reduction of capacity of the coagulating or settling system, in the recovery of water useful as a recycle medium, and/or in the recovery of a liquid medium containing valuable solubilized metal salts therein. These and numerous other objects will become apparent to those skilled in the art from a consideration of the instant invention.

The broad aspect of the present invention contemplates the coagulation of solids comprising clay mineral suspended in a liquid medium by the addition thereto of a coagulating amount of poly(ethylene oxide) which has a reduced viscosity in acetonitrile of at least 1.0 and upwards to 75, and higher. The clay minerals encompassed within the scope of this invention are those previously described, namely the kaolin, montmorillonite and illite (hydromicas) groups. Halloysite is usually classed under the kaolin group by various noted authorities; however, since some authorities hold halloysite to constitute a fourth class, this latter class is likewise considered within the purview of the instant invention. Illustrative subgroups and species falling within the above-said main groups have been mentioned previously. The coagulant employed in the instant invention, namely poly(ethylene oxide) having a reduced viscosity in acetonitrile of at least 1.0, is effective in coagulating or flocculating from a liquid system suspended clay minerals per se, admixture of clay minerals, clay minerals containing varying quantities of impurities or inert material such as other minerals, e.g., phosphate rock (calcium phosphate or calcium phosphate-containing compounds), limonite, dolomite; pulverized shale, asbestos, and the like; calcium chloride, calcium carbonate, sodium chloride, iron sulfate, aluminum sulfate, sodium carbonate and bicarbonate, etc.; clay minerals admixed in the same system with the previously illustrative list of impurities and inert material; and mixtures of the above illustrations. As will be shown hereinafter from the operative examples, the poly(ethylene oxides) employed are effective in liquid suspension systems wherein the pH of said systems vary from acidic to basic.

The poly(ethylene oxides) employed in this invention are solid, colorless, water-soluble compounds. They appear to form homogeneous systems in water in all proportions, although the relatively higher molecular weight ethylene oxide polymers merely swell on the addition of small amounts of water. On the addition of greater amounts of water, the polymers pass into solution. The water solutions are viscous, the viscosity increasing both with the concentration of the polymer in the solution and the reduced viscosity of the polymer. The ethylene oxide polymers are employed in this invention show little change in melting point with increased reduced viscosity (an indication of increased molecular weight) and the melting point, as measured by change in stiffness with temperature, was found to be about 65°±2° C. throughout the range of reduced viscosities of from about 1.0 to about 10, and greater. These polymers, upon X-ray examination, show the sort of crystallinity exhibited by polyethylene. The crystallization temperature, as determined from measuring the break in the cooling curve, is about 55° C. The polymers of ethylene oxide possessing a reduced viscosity of at least 1.0 are hard, tough, horny, water-soluble materials. The preparation of these polymers will be fully described hereinafter in this specification.

By the terms "coagulating amount" or "flocculating amount," as used herein, are meant that quantity of poly(ethylene oxide) which when added to a system comprising a dispersion, suspension or slurry of solids comprising clay mineral in a liquid medium, is sufficient to coagulate or flocculate said solids. The amount of poly(ethylene oxide) necessary to coagulate or flocculate the solids in the system is governed, to an extent, by the reduced viscosity of the poly(ethylene oxide), the paritcular clay mineral or minerals in the system, the particle size of the solids, the various impurities or contaminants contained in the clay mineral, the presence and kind of inert solids in the system, the solids content of the system, and other factors. The higher the reduced viscosity value of the poly(ethylene oxide), the lower, in general, the amount of poly(ethylene oxide) necessary to effect coagulation. The art is well apprised of the technique of coagulating, precipitating or flocculating the solids content from liquids containing these solids in dispersed, suspended or slurried form, and the over-all amount of poly(ethylene oxide) employed will be determined by the optimum conditions desired, the economics of the process, and the factors illustrated previously.

In general, a poly(ethylene oxide) concentration in the range of from about 0.0001, and lower, to about 5.0 weight percent, and higher, based on the weight of suspended clay mineral in the suspension or slurry, gives effective results; from about 0.0001 to about 2.0 weight percent, based on the suspended clay mineral, is preferred; and from about 0.001 to about 1.0 weight percent, based on the weight of suspended clay mineral, is still further preferred. By the practice of this invention, it will be observed that the rates of filtration and/or sedimentation are greatly enhanced.

In one embodiment of this invention, the systems which are effectively coagulated by the addition thereto of poly(ethylene oxide) are the so-called phosphate slimes. The word "slime" generally suggests to the average person a slippery, viscous, ooze or mud; however, to thoses skilled in the art, such as metallurgists, a slime generally connotes ultrafine material difficult to dewater and resistant to ordinary methods of beneficiation. The phosphate slimes fall within this category. The mining and treating of raw phosphate, known as matrix, by hydraulic methods results in the consumption of tens of millions of tons of water annually. Wet screening, classifiers, and huge hydroseparators can remove the solids content from the matrix up to about 150 mesh. However, the matrix containing solids which have a particle size of about minus 150 mesh is discarded or discharged as waste into artificial settling ponds or lagoons. It is estmiated that, for every 1⅓ cubic yards of water employed in the mining operation, only one cubic yard is recoverable as reusable water. Consequently, enormous phosphate slime lakes now exist which are destroying the value of large tracts of land beneath these unsightly slime ponds. It has also been estimated that, for each ton of high-grade pebble phosphate rock recovered, over one ton of slime (dry basis) is discarded. A mineralogical analysis of a typical Florida phosphate slime reveals that approximately 90 percent of the solids comprise apatite, kaolinite,[1] wavellite and limonite, with apatite comprising over one-third of the solids content of the slime. Hence, a tremendous quantity of the desired phosphate rock is discarded into the settling ponds.

As will be apparent from the data of the operative examples set forth hereinafter, synthetic phosphate slurries, and phosphate slimes, were very effectively coagulated by the addition of poly(ethylene oxide) thereto. It is interesting to note the results in Table XXI which disclose that, after a period of settling of 20 days, the slime sample treated with poly(ethylene oxide) had a sediment containing about 30 weight percent more solids than the sediment of corresponding slime samples not treated with poly(ethylene oxide).

Another embodiment of this invention is directed to coagulating metal-containing ore slurries such as uranium ore slurries by adding poly(ethylene oxide) thereto. In the mining of uranium-containing ore to recover the small but valuable uranium values therefrom, the uranium ore is pulverized to a finely-divided particle form and subsequently is subjected to a conventional leaching process. The purpose of the leach process is to solubilize the uranium values into the liquid leach medium in the form of dissolved uranium salts. The enriched uranium-containing liquid, known as "pregnant liquor," is then treated to recover the solubilized uranium salts therefrom. Two illustrative leach processes presently employed are the sulfuric acid leach and the sodium carbonate leach (usually in admixture with sodium bicarbonate). In the acid leach sulfuric acid is added, generally at room temperature, to the ore in an amount sufficient to solubilize the uranium values. The resulting mixture is stirred for a few minutes and then aged for a period of time, e.g., overnight. Following this, water is added thereto to an amount so as to obtain the most concentrated pregnant liquor. In the carbonate leach, an aqueous solution of sodium carbonate-sodium bicarbonate is added to the ore in an amount to give a liquid-solids admixture containing, for example, about 50 weight percent solids. The resulting admixture is maintained at elevated temperatures, e.g., about 90° C., for a period of time ranging from minutes to several hours;

---

[1] Various authorities hold that the clay content is montmorillonite and/or attapulgite rather than kaolin.

general about 6 hours is sufficient to solubilize the uranium values. The admixture during his solubilization period can be hand-stirred, and oftentimes air is blown through the admixture to oxidize the uranium content in the ore. Upon cooling the liquid-solids admixture to room temperature, coarse particles will settle to the bottom of the system, if present. At this stage, whether the acidic or basic leach procedure is employed, it is desirable to recover the maximum pregnant liquor so that the greatest efficiency is obtained in recovering the solubilized uranium values. However, it is observed that finely-divided particles are suspended or dispersed throughout the liquid-solids admixture (oftentimes referred to as uranium ore slurry). At least a portion of the suspended solids is clay mineral(s) in view of the universal occurrence of clay mineral. Consequently, it is conventional to add a coagulant to the above-said slurry to flocculate or coagulate the solids content therein, and subsequently recover the uranium-enriched fluid therefrom.

By the practice of the instant invention, a coagulating amount of poly(ethylene oxide) added to the said leached uranium ore slurry effectively coagulated the solids content, gave excellent solids compaction in the sediment layer, and resulted in the recovery of optimum quantities of uranium-enriched liquid. It was also observed that the solids content of an unleached uranium ore slurry was effectively coagulated by the addition thereto of poly(ethylene oxide). It is also pointed out that the effectiveness of coagulating phosphate slimes and uranium ore slurries can be improved by adding as little as 5 weight percent, and lower, based on the solids content of the system, of a clay mineral such as a bentonite clay, before, during or after the addition of poly(ethylene oxide) to the system. It is to be understood that this embodiment of the instant invention is not limited solely to the coagulation of leached and unleached uranium ore slurries, with or without the addition of extraneous clay mineral thereto, but the invention encompasses the coagulation of leached and unleached metal-containing ore slurries such as the precious metal-containing ore slurries, for example, platinum, gold, rare earth metals, and others, which slurries may or may not contain added extraneous clay mineral, by incorporating into the system a coagulating amount of poly(ethylene oxide).

It is generally held that a common property of clay minerals that leads to the formation of stable suspensions (approaching colloidal-like size) in liquid medium is a negative electrical charge on the suspended particle. The magnitude of this charge, termed zeta potential, is related directly to the stability of the suspended particles toward flocculation. As the zeta potential of the clay is reduced to approach the isoelectric point (zeta potential equals zero), the electrical repulsion of the similarly charged clay particles is diminished. Perikinetic flocculation[2] occurs when the charge repulsion is not sufficient to counterbalance the interparticle forces of attraction. By picturing clay minerals as ion-exchange media, the most stable particle dispersions are those prepared with sodium or potassium ions (alkali metal ions) as counter ions. In this state, the size of the ionic double layer surrounding the clay particle is at a maximum as in the zeta potential. Ion-exchange reactions which substitute alkaline earth metal cations, e.g., $Ca^{++}$, $Mg^{++}$, etc., group III metal cations, $Al^{+++}$, $Fe^{+++}$, etc., or $H^+$, for the alkali metal ions tend to "destabilize" the dispersion by decreasing or eliminating the charge repulsion and by reducing the size of the ionic double layer. Although destabilization of the clay suspension in this manner leads to flocculation (perikinetic), the floc particles formed are usually of too low a strength to withstand mechanical stresses imposed by sedimentation and filtration processes. Floc strength, however, can be improved by the presence of a binder material which is supplemental to the natural interparticle forces of attraction. With flocculants such as alum and ferric chloride, Langelier proposed that the insoluble hydroxides formed by hydrolysis of these materials served as binder material once the clay or particle was destabilized by the plus three cation.

The voluminous data in this specification discloses that poly(ethylene oxide) functions in the capacity of an exceedingly effective and improved binder reagent for clay and clay-like suspensions which are naturally destabilized or those which are destabilized upon the addition of polyvalent cations or acids. The numerous operative examples teach that poly(ethylene oxide) exhibits a higher degree of flocculation with a calcium bentonite clay whereas a relatively lower degree of flocculation is observed with a sodium bentonite clay, though in all instances, favorable flocculation does occur. Other examples teach that clay slurries with a relatively low degree of flocculation to poly(ethylene oxide) treatment were rendered more responsive to the coagulation efficiency of poly(ethylene oxide) by incorporating, for example, $CaCl_2$ or $FeCl_3$, to the system. In like manner, clay which responded very favorably to the coagulation efficiency of poly(ethylene oxide) were rendered less amenable to the poly(ethylene oxide) treatment by the addition of alkali metal salts to the system. Again, however, it is pointed out that the clay mineral in all instances responded to the coagulation efficiency of poly(ethylene oxide) though varying degrees of effectiveness were observed. In addition, it was observed that the addition of 5.0 weight percent of sodium bentonite slurry impaired the performance of the poly(ethylene oxide). In like manner, increasing dosages of calcium bentonite to a sodium bentonite slurry improved the performance, though in every instance poly(ethylene oxide) reveals its coagulation efficiency in varying degrees. The data in this specification also demonstrates that poly(ethylene oxide) had little measurable flocculation effect on a dispersion of relatively pure minus 200 mesh phosphate rock. The addition of only 5.0 weight percent calcium bentonite clay to this phosphate rock slurry, however, had a very pronounced flocculation effect as indicated by rapid rates of sedimentation and filtration. In general, it was observed that, where the performance of the coagulation efficiency of poly(ethylene oxide) is low, due to the high zeta potential of the clay mineral, or lowered by the addition of clay mineral to the system containing a high zeta potential (such as sodium bentonite), a higher dosage of poly(ethylene oxide) was required to effect coagulation (as compared to the bentonite slurry).

The mechanism by which poly(ethylene oxide) achieves its binding action to the clay mineral is not presently known. It has been observed, however, that the strength of the attachment between the clay mineral and poly(ethylene oxide) is inversely proportional to the zeta potential of the clay mineral. Consequently, a particularly preferred embodiment of this invention is directed to coagulating or flocculating solids comprising clay mineral suspended in liquid media, said clay mineral having a zeta potential approximately no greater than, and preferably less than, the zeta potential of sodium bentonite. The above-said preferred embodiment is shown by the operative examples in this specification to possess several advantages among which can be listed the following:
(1) The sediment density of the calcium clay upon treatment with poly(ethylene oxide) is much greater than that of the sodium clay under corresponding conditions. The high density can result from face to face orientation of the clay platelet which would come about when the negative charge density is low as in the calcium clay.
(2) A relative higher dosage of poly(ethylene oxide) is required to flocculate the sodium clay than is the case with the calcium clay under corresponding conditions. This factor can be due to the high repulsive forces be-

---

[2] Defined in "Mechanism of Flocculation in the Clarification of Turbid Waters," by W. F. Langelier, Journal of American Water Works Association, 41, 163 (1939).

tween the sodium clay particles and thus would require more binding agent (ethylene oxide polymer) to yield a strong floc. (3) Treatment which reduces the negative charge density on the sodium clay, e.g., hydration in strong mineral acid or salt solutions, addition of polyvalent cations, etc., can convert said clay to a form more responsive to coagulation efficiency of the poly(ethylene oxide).

Another embodiment of this invention is directed to a process for increasing the coagulability of an aqueous suspension comprising clay mineral which comprises adding a member selected from the group consisting of polyvalent metal bentonites, polyvalent metal salts, and strong inorganic acids, to said suspension, and subsequently adding thereto a coagulating amount of poly(ethylene oxide) having a reduced viscosity of at least 1.0 to coagulate the solids content of said suspension. Alternatively, the poly(ethylene oxide) can be added prior to the addition of the above-said member.

Another embodiment of this invention is directed to the clarification of turbid waters which owe their turbidity to dispersed clay particles, in toto or in part, by adding to said turbid waters a coagulating amount of poly(ethylene oxide). Turbidity which is poorly responsive to the poly(ethylene oxide) treatment can be made responsive by the addition to the turbid water of an adsorptive clay or clay mineral, followed by treatment with poly(ethylene oxide). Upon flocculation, the solid impurities are enmeshed in the floc which can be removed by sedimentation or filtration. It should be noted that sodium bentonite can be employed to advantage since the natural hardness of the water, i.e., presence of calcium ions, ferric ions, etc., would tend to destabilize the clay so that it would respond more efficiently to poly(ethylene oxide) treatment.

It is feasible to add the poly(ethylene oxide) to the suspension or slurry as an aqueous solution. The preparation of an aqueous solution of poly(ethylene oxide) beforehand eliminates the necessity of extensive stirring or agitation which can be occasioned by the addition of poly(ethylene oxide) in a solid form to dissolve same, and moreover, the use of aqueous poly(ethylene oxide) solution lends itself as an attractive commercial expedient. If one desires, poly(ethylene oxide) in solid form can be added to the slurry or suspension in question; however, this method of addition is not preferred.

Before proceeding with the discussion regarding the preparation of the poly(ethylene oxides) which are employed in the instant invention, various terms will be defined to facilitate the understanding of the subject matter involved. It is pointed out that the word "poly(ethylene oxide)" as used throughout the specification, including the appended claims, refers to ethylene oxide polymers which have a reduced viscosity in acetonitrile of at least 1.0 and upwards to 75, and higher, or an apparent viscosity, aqueous bulk viscosity, or intrinsic viscosity which, if converted, would be equivalent to a reduced viscosity of at least 1.0. The poly(ethylene oxides) employed in the present invention can be more aptly defined by the several physical characteristics or properties enumerated previously.

Unless otherwise stated, by the term "reduced viscosity," as used herein, is meant a value obtained by dividing the specific viscosity by the concentration of the ethylene oxide polymer in the solution, the concentration being measured in grams of polymer per 100 milliliters of solvent at a given temperature, and is regarded as a measure of molecular weight. The specific viscosity is obtained by dividing the difference between the viscosity of the solution and the viscosity of the solvent by the viscosity of the solvent. The reduced viscosities herein referred to are measured at a concentration of 0.2 gram of poly(ethylene oxide) in 100 milliliters of acetonitrile at 30° C. (unless stated otherwise).

By the term "intrinsic viscosity" is means the value at zero concentration of the reduced viscosity concentration curve. In other words, intrinsic viscosity is, in effect, the reduced viscosity extrapolated to the zero concentration of polymer solution.

The term "aqueous bulk viscosity," as used herein, refers to the viscosity of the stated concentration of polymer in water, as measured at two revolutions per minute on a Model RVF Brookfield viscosimeter at ambient room temperature, i.e., about 24° C. to about 27° C. As the reuced viscosity increases over a range of from above about 1.0 upward to 75, and higher, the aqueous bulk viscosity, on the average, will increase. The term is an indication of the molecular weight.

The term "bulk polymerization process" refers to polymerization in the absence of an organic medium or diluent. The term "solution polymerization" refers to polymerization in the presence of an organic medium or diluent in which both the monomer employed and the polymer produced are soluble. The term "suspension polymerization process" refers to polymerization in the presence of an organic medium in which the monomer employed is soluble and the polymer produced is insoluble. Granular poly(ethylene oxide) results from the suspension polymerization of an agitated reaction mixture comprising ethylene oxide in contact with a polymerization catalyst therefor, e.g., heptane, in which ethylene oxide is soluble and the resulting poly(ethylene oxide) is insoluble. Granular poly(ethylene oxide) thus produced is obtained in a finely-divided solid particle state and resembles finely-divided sand in particle size. Unlike the granular poly(ethylene oxide) resulting from the suspension polymerization process, the bulk and solution polymerization processes yield a polymer which is substantially a homogeneous mass either conforming to the shape of the reaction vessel or, after driving off the organic medium, for example, by mechanical extrusion, e.g., Marshall Mill (under vacuum and at slightly elevated temperatures), resembles layers or sheets. This polymer subsequently can be reduced in particle size, for example, by dicing or the like.

The term "granular" refers to the particle size of the ethylene oxide polymers prepared by suspension polymerization. A granular product is one which is in a free-flowing state and comprises particles averaging less than 5 mesh in size (U.S. Standard Size Sieve).

The preparation of alkylene oxide polymers such as poly(ethylene oxide), poly(propylene oxide), poly(butylene oxide) and the like which have a reduced viscosity in the range from about 1.0 to about 60, and higher, is the subject matter of the application entitled "Polymerization of Epoxides," by F. N. Hill and F. E. Bailey, Jr., Serial No. 587,933, filed May 29, 1956, now abandoned, and assigned to the same assignee as the instant application. The reduced viscosities of poly(ethylene oxide) referred to in the above-said application are measured in acetonitrile at a concentration of 0.2 gram of polymer per 100 milliliters of solvent at 30° C.; the reduced viscosities of the other alkylene oxide polymers are more conveniently measured in benzene. The above-mentioned application teaches the preparation of poly(alkylene oxide), e.g., poly(ethylene oxide), by polymerizing alkylene oxide in contact with certain metal carbonate catalysts, such as, for example, calcium carbonate, barium carbonate, strontium carbonate and others. These metal carbonate catalysts are advantageously employed in concentrations in the range from about 0.3 to 3 parts by weight per 100 parts by weight of alkylene oxide. The polymerization reaction can be conducted in the liquid phase at a temperature in the range from about 70° to about 150° C. It is preferred that the metal carbonate catalyst contain not more than one part by weight of nonsorbed water per 100 parts by weight of monomer, and at least 0.01 part by weight of sorbed water per 100 parts by weight of catalyst. It is further preferred that the carbonate catalyst be free from ions which reduced their catalytic activity such as, for example, chlorate and thiosulfate ions. For further information regarding the production of poly(alkylene oxide) reference is hereby made to the disclosure of the above-identified application Serial No. 587,933.

The preparation of granular poly(ethylene oxide) having a reduced viscosity in acetonitrile in the range from about 1.0 to about 60, and higher, is the subject matter of the application entitled "Polymerization of Epoxides and New Products Obtained Thereby," by F. N. Hill, J. T. Fitzpatrick, and F. E. Bailey, Jr., Serial No. 587,955, filed May 29, 1956, and assigned to the same assignee as the instant application. This application teaches the preparation of poly(ethylene oxide) by polymerizing ethylene oxide in contact with about 0.2 to about 10 parts by weight, per 100 parts by weight of monomer, of a catalyst such as the alkaline earth metal amides, hexammoniates, or the decomposition products of hexammoniates. The polymerization reaction is preferably conducted at a temperature in the range from about 0° to 70° C. and is carried out in the presence of a liquid organic medium such as the normally liquid straight or branch chain saturated hydrocarbons, cyclic and alkyl-substituted cyclic saturated hydrocarbons and the like, e.g., heptane, methylcyclopentane, etc., in which ethylene oxide is soluble and the poly(ethylene oxide) is insoluble. Agitation of the reaction mixture during the polymerization results in the production of granular ethylene oxide polymer having a reduced viscosity in acetonitrile above about 1.0, and generally above about 30 and up to 60, and higher. The granular poly(ethylene oxide) can be recovered from the reaction mixture by decanting the organic medium and vacuum drying the ethylene oxide polymer. The poly(ethylene oxide) is obtained in a granular state, i.e., a finely-divided solid particle form resembling in particle size finely-divided sand. For further information regarding the production of granular poly(ethylene oxide) reference is hereby made to the disclosure of application Serial No. 587,955.

Lower olefin oxides such as ethylene oxide, propylene oxide, butylene oxide, and the like, can also be polymerized, in the presence of certain divalent metal amide-alcoholate catalysts, to solid polymers having a reduced viscosity of at least 1.0. This polymerization process is subject matter of application Serial No. 674,308, entitled "Epoxide Polymerization and Compounds Therefor," by F. N. Hill, J. T. Fitzpatrick, and F. E. Bailey, Jr., filed July 26, 1957, now abandoned, and assigned to the same assignee as the instant application. The particular class of catalysts employed in the polymerization process of the above-said application is the metal amide-alcoholates wherein the metal radical is a divalent metal with an atomic number greater than 4 and less than 57 from group II of the periodic table. One method of preparing these catalysts is by the reaction of, for example, calcium hexammoniate with ethylene oxide in liquid ammonia to give calcium amide-ethylate. The polymerization reaction is a liquid phase reaction and can be effected at temperatures as low as −30° C. and as high as +150° C. In a preferred embodiment, ethylene oxide can be polymerized in the presence of an inert liquid organic medium in which the monomer is soluble and the resulting polymer is insoluble. Agitation of the reaction mixture and controlling the temperature between about −30° C. to about +70° C. results in the production of poly(ethylene oxide) in granular form. For further information regarding this polymerization route reference is hereby made to the disclosure of the above-identified application Serial No. 674,308.

In addition, ethylene oxide polymers which have been molecularly degraded to a reduced viscosity above about 1.0 by the reaction with a halogenating agent such as an alkali metal hypochlorite or alkaline earth metal hypochlorite can be employed in the instant invention with suitable results. The molecular degradation of poly(ethylene oxide) via treatment with a halogen or halogen-liberating compound is the subject matter of application Serial No. 668,306 entitled "Halogen Modified Poly(Alkylene Oxide) Resins," by K. L. Smith et al., filed June 27, 1957, and assigned to the same assignee as the instant application. Ethylene oxide polymers having a reduced viscosity above about 1.0 which have been subjected to reduced viscosity loss, i.e., decrease in molecular weight, via treatment with a peroxide compound, notably peracetic acid, are likewise suitable and conveniently employed in the instant invention. The peroxide compound degradation treatment is the subject matter of application Serial No. 668,547, entitled "Alkylene Oxide Polymers," by K. L. Smith and E. C. Seltzer, filed June 27, 1957, now Patent No. 2,982,742, and assigned to the same assignee as the instant application.

The instant invention also contemplates the use of poly(ethylene oxide) having an antioxidant incorporated therein such as those disclosed in application Serial No. 587,953, entitled "Chemical Process and Product," by F. N. Hill, filed May 29, 1956, now Patent No. 2,897,178, and assigned to the same assignee as the instant application. Among the antioxidants disclosed in the above-mentioned application include the use of diamine derivatives such as N,N-di(2-hydroxypropyl)-di-(2-hydroxyethyl)-ethylenediamine, N,N,N'-tri(2-hydroxypropyl)-N'-(2-hydroxyethyl) - ethylenediamine, N,N,N',N' - tetrakis(2-hydroxypropyl)-ethylenediamine, and others. The antioxidants can be employed at a concentration in the range from about 0.5 to 5.0 weight percent, and higher, based on the polymer weight.

The following examples are illustrative.

EXAMPLE 1

In Examples 1 through 4, the poly(ethylene oxide) employed was prepared in a 650-gallon capacity stainless steel autoclave by the heptane suspension process using calcium amide catalyst. The polymer contained 1.2 percent ash by weight as calcium oxide and possess a 1.0 weight percent aqueous bulk viscosity of 1147 centipoises as measured on the Brookfield RVF viscometer at 2 r.p.m. using a No. 1 spindle. The poly(ethylene oxide) was employed as a 0.25 weight percent solution in distilled water in said Examples 1 to 4.

Kaolinite [3] was added to a quantity of distilled water in an amount so as to give a liquid-solids admixture containing 5 weight percent solids, based on the total weight of said admixture. This admixture was then subjected to agitation for a period of 30 minutes by means of two 3-blade propellers of a Model L Lightnin Mixer operating at full speed. Subsequently, several 100 milliliter samples of the resulting slurry or suspension were transferred volumetrically to graduated cylinders, the height of the slurry being approximately 18 centimeters therein. The time noted for the slurry-supernatant liquid interface of the control to drop to various levels (measured in centimeters of supernatant liquid) was recorded in seconds. To several of the above kaolinite slurry samples contained in the graduated cylinders, there were added various inorganic contaminants, and the time required for the interface to drop to various levels was again recorded in seconds. Lastly, the effect on the remaining slurry samples of various concentrations of the ethylene oxide polymer described above was determined, together with the combined effect of the inorganic contaminants added to the kaolinite suspension prior to the poly(ethylene oxide) addition. It is pointed out that following the addition of the inorganic contaminants and/or poly(ethylene oxide) to the various kaolinite slurry samples, the graduated cylinders containing same were inverted five times, by hand, to facilitate mixing of the resulting admixture. The results and pertinent data are set out in Table I below.

[3] Highly purified "Ajax" kaolinite (plates) obtained from the Georgia Kaolin Company; ground to minus 200 mesh, U.S. Standard Sieve.

Table I

EFFECT OF POLY(ETHYLENE OXIDE) ON COAGULATION OF SLURRY COMPRISING 5.0 WEIGHT PERCENT KAOLINITE

| Run No. | Inorganic contaminants, weight percent [1] | Poly(ethylene oxide), weight percent [1] | pH of slurry | Time in seconds for slurry—supernatant liquid interface to settle the indicated distance in cm. | | | | | | | |
|---|---|---|---|---|---|---|---|---|---|---|---|
| | | | | 0.9 | 1.8 | 3.6 | 5.4 | 7.2 | 9.0 | 10.8 | 12.6 [2] |
| 1 | None | None | 5.3 | [3] 900 | ---- | ---- | ---- | ---- | ---- | ---- | ---- |
| 2 | do | 0.025 | 5.3 | ---- | 2 | 5 | 9 | 12 | 19 | [4] 38 | ---- |
| 3 | do | 0.050 | 5.3 | ---- | 2 | 4 | ---- | ---- | 18 | [4] 40 | ---- |
| 4 | 1% FeCl$_3$ | None | 2.7 | >900 | ---- | ---- | ---- | ---- | ---- | ---- | ---- |
| 5 | 1% FeCl$_3$ | 0.025 | 2.7 | ---- | 26 | 53 | 81 | 115 | [4] 205 | ---- | ---- |
| 6 | 1% FeCl$_3$ | 0.050 | 2.7 | ---- | 11 | 25 | 41 | 68 | [4] 142 | ---- | ---- |
| 7 | 1% NaCl | None | 4.8 | 900 | ---- | ---- | ---- | ---- | ---- | ---- | ---- |
| 8 | 1% NaCl | 0.025 | 4.8 | ---- | 2 | 5 | 10 | 14 | 21 | [4] 43 | ---- |
| 9 | 1% NaHCO$_3$ | None | 7.3 | 530 | >900 | ---- | ---- | ---- | ---- | ---- | ---- |
| 10 | 1% NaHCO$_3$ | 0.025 | 7.3 | ---- | 16 | 36 | 55 | 75 | 98 | [4] 157 | ---- |
| 11 | 1% NaHCO$_3$ | 0.050 | 7.3 | ---- | 1 | 2 | 6 | 9 | 14 | 32 | 300 |

[1] Based on the weight of kaolinite.
[2] This horizontal row represents centimeters of supernatant liquid.
[3] This horizontal row and those below represent time in seconds for indicated height of supernatant liquid to appear, measured in centimeters.
[4] Solids have settled to region of compressive subsidence beyond which further compaction was very slow.

EXAMPLE 2

Hectorite [4] was added to a quantity of distilled water in an amount so as to give a liquid-solids admixture containing 5.0 weight percent solids, based on the total weight of said admixture. The procedure and treatment described in Example 1 supra was then repeated with the resulting hectorite-liquid admixture with the exception that in those runs employing poly(ethylene oxide) the concentration was fixed, namely 0.40 weight percent poly(ethylene oxide), based on the weight of hectorite, was used. The results and pertinent data are set out in Table II below.

EXAMPLE 3

Attapulgite [5] was added to a quantity of distilled water in an amount so as to give a liquid-solids admixture containing 5 weight percent solids, based on the total weight of said admixture. The procedure and treatment described in Example 1 supra was then repeated with the resulting attapulgite-liquid admixture. The results and pertinent data are set out in Table III below.

Table III

EFFECT OF POLY(ETHYLENE OXIDE) ON COAGULATION OF SLURRY COMPRISING 5.0 WEIGHT PERCENT ATTAPULGITE

| Run No. | Inorganic contaminants, weight percent [1] | Poly(ethylene oxide), weight percent [1] | pH of slurry | Time in seconds for slurry—supernatant liquid to settle the indicated distance in cm. | | | | | | | |
|---|---|---|---|---|---|---|---|---|---|---|---|
| | | | | 0.9 | 1.8 | 3.6 | 5.4 | 7.2 | 9.0 | 10.2 | 12.6 [2] |
| 1 | None | None | 7.8 | [3] 300 | 600 | >900 | ---- | ---- | ---- | ---- | ---- |
| 2 | do | 0.013 | 7.8 | 3 | 6 | 10 | 14 | 22 | [4] 65 | ---- | ---- |
| 3 | do | 0.025 | 7.8 | 1 | 3 | ---- | 7 | 13 | [4] 80 | ---- | ---- |
| 4 | 1% FeCl$_3$ | None | 5.3 | 230 | 550 | >900 | ---- | ---- | ---- | ---- | ---- |
| 5 | 1% FeCl$_3$ | 0.013 | 5.3 | 2 | 5 | 8 | 13 | 19 | [4] 70 | ---- | ---- |
| 6 | 1% NaCl | None | 7.5 | 320 | 620 | >900 | ---- | ---- | ---- | ---- | ---- |
| 7 | 1% NaCl | 0.013 | 7.5 | 8 | 18 | 28 | 38 | 57 | [4] 150 | ---- | ---- |
| 8 | 1% NaHCO$_3$ | None | 8.4 | 330 | 620 | >900 | ---- | ---- | ---- | ---- | ---- |
| 9 | 1% NaHCO$_3$ | 0.013 | 8.4 | 4 | 11 | 18 | 26 | 41 | [4] 120 | ---- | ---- |

[1] Based on the weight of attapulgite.
[2] This horizontal row represents centimeters of supernatant liquid.
[3] This horizontal row and those below represent time in seconds for indicated height of supernatant liquid to appear, measured in centimeters.
[4] Solids have settled to region of compressive subsidence beyond which further compaction was very slow.

Table II

EFFECT OF POLY(ETHYLENE OXIDE) ON COAGULATION OF SLURRY COMPRISING 5.0 WEIGHT PERCENT HECTORITE

| Run No. | Inorganic contaminants, weight percent [1] | Poly(ethylene oxide), weight percent [1] | pH of slurry | Time in seconds for slurry—supernatant liquid face to settle the indicated distance in cm. | | | |
|---|---|---|---|---|---|---|---|
| | | | | 0.9 | 1.8 | 3.6 | 7.2 [2] |
| 1 | None | None | 8.2 | [3] >900 | ---- | ---- | ---- |
| 2 | do | 0.40 | 8.2 | ---- | [4] 420 | ---- | ---- |
| 3 | 1% FeCl$_3$ | None | 7.0 | >900 | ---- | ---- | ---- |
| 4 | 1% FeCl$_3$ | 0.40 | 7.0 | ---- | 40 | [4] 210 | ---- |
| 5 | 1% NaCl | None | 8.2 | >900 | ---- | ---- | ---- |
| 6 | 1% NaCl | 0.40 | 8.2 | ---- | 600 | [4] 900 | ---- |
| 7 | 1% NaHCO$_3$ | None | 8.4 | >900 | ---- | ---- | ---- |
| 8 | 1% NaHCO$_3$ | 0.40 | 8.4 | ---- | [4] 900 | ---- | ---- |

[1] Based on the weight of hectorite.
[2] This horizontal row represents centimeters of supernatant liquid.
[3] This horizontal row and those below represent time in seconds for indicated height of supernatant liquid to appear, measured in centimeters.
[4] Solids have settled to region of compressive subsidence beyond which further compaction was very slow.

EXAMPLE 4

Illite [6] was added to a quantity of distilled water in an amount so as to give a liquid-solids admixture containing 5 weight percent solids, based on the total weight of said admixture. The procedure and treatment described in Example 1 supra was then repeated with the resulting illite-liquid admixture. The results and pertinent data are set out in Table IV below.

---

[5] A clay mineral, predominantly attapulgite, obtained from Baroid Company under the name "Zeogel"; ground to minus 200 mesh, U.S. Standard Sieve.
[6] Obtained from Grundy County, Illinois; ground to minus 200 mesh, U.S. Standard Sieve.

[4] Highly purified sodium hectorite; ground to minus 200 mesh, U.S. Standard Sieve.

Table IV
EFFECT OF POLY(ETHYLENE OXIDE) ON COAGULATION OF SLURRY COMPRISING 5.0 WEIGHT PERCENT ILLITE

| Run No. | Inorganic contaminants, weight percent [1] | Poly(ethylene oxide), weight percent [1] | pH of slurry | Time in seconds for slurry—supernatant liquid to settle the indicated distance in cm. | | | | | | |
|---|---|---|---|---|---|---|---|---|---|---|
| | | | | 0.9 | 1.8 | 5.4 | 7.2 | 9.0 | 12.6 | 14.4 [2] |
| 1 | None | None | 6.7 | [3] >900 | | | | | | |
| 2 | ----do---- | 0.025 | 6.7 | | 8 | 24 | 33 | 41 | 75 | [4] 300 |
| 3 | ----do---- | 0.050 | 6.7 | | | | | | 3 | [4] 300 |
| 4 | 1% FeCl₃ | None | 3.2 | | 85 | 270 | 360 | 480 | 770 | >900 |
| 5 | 1% FeCl₃ | 0.025 | 3.2 | | | | | | 5 | [4] 60 |
| 6 | 1% NaCl | None | 6.5 | | | | | [5] 900 | | |
| 7 | 1% NaCl | 0.025 | 6.5 | | | | | 4 | 7 | [4] 300 |
| 8 | 1% NaHCO₃ | None | 7.9 | >900 | | | | | | |
| 9 | 1% NaHCO₃ | 0.025 | 7.9 | | | | | 5 | 13 | [4] 300 |

[1] Based on weight of illite.
[2] This horizontal row represents centimeters of supernatant liquid.
[3] This horizontal row and those below represent time in seconds for indicated height of supernatant liquid to appear, measured in centimeters.
[4] Solids have settled to region of compressive subsidence beyond which further compaction was very slow.
[5] Extremely turbid supernatant liquid.

In Examples 5 to 8 to follow, the poly(ethylene oxide) employed will be designated as poly(ethylene oxide) No. 12 and poly(ethylene oxide) No. 34 for identification purposes only. The No. 12 polymer was prepared by the heptane suspension polymerization of ethylene oxide in the presence of calcium amide catalyst; this polymer had a 1.0 weight percent aqueous bulk viscosity of 7,000 centipoises at 25° C. The No. 34 polymer was prepared by the heptane suspension polymerization of ethylene oxide in the presence of an ethylene oxide modified calcium amide catalyst; the resulting polymer (No. 34) had an intrinsic viscosity of 19.2, a reduced viscosity of 38.2, and a 1.0 weight percent aqueous bulk viscosity of 3400 centipoises at 25° C.

In addition, the uranium ores which are treated in Examples 5 to 8 were obtained from the Colorado Plateau, and these ores are designated as (a) Trace Elements, Rich, (b) Trace Elements, Low Grade, (c) Blue Ore, and (d) Uravan. The clay constituent of these uranium ores contained uranium values therein, generally in the form of uranium oxide. The clay constituent can be beidellite, montmorillonite, halloysite, or sericite, or mixtures thereof.

In the recovery of the uranium values from the uranium ore, it is customary to leach the above-said ore either with an acidic or basic medium, e.g., sulfuric acid or a sodium carbonate-bicarbonate mixture, to dissolve the uranium values in the acidic or basic leach medium. At the desired point in the leaching process, it is advantageous to add a coagulant in order to coagulate or flocculate the dispersed clay and solids, and subsequently the liquid medium enriched with uranium salts is recovered by conventional techniques such as by sedimentation and/or filtration. Obviously, the larger the quantity of enriched liquid medium recoverd, the greater the percent recovery of the uranium salts which are present or solubilized in said liquid.

EXAMPLE 5

A 4260-gram sample of Trace Elements, Rich uranium ore [7] was blended with 99 milliliters of 96 percent sulfuric acid having a specific gravity of 1.84 (equivalent to 85 pounds of acid per ton of ore) by hand-mixing for a period of 15 minutes. To this acidified uranium ore there was added, over a period of 15 minutes and under constant hand-mixing, 270 milliliters of water (equivalent to 1½ times the weight of $H_2SO_4$ employed). The resulting moistened ore was aged for 16 hours at room temperature to facilitate the solubilization of the uranium values. Three liters of water was subsequently added to the aged moistened ore and stirred for a period of 5 minutes with a Model L Lightnin Mixer after which the coarse particles were allowed to settle. The supernatant slime fraction was recovered by decantation and diluted with water to a total volume of 4 liters. The resulting slime (or slurry or suspension) is designated as TER–60 in Table V below and had a pH of 1.7 and a solids content of 20 weight percent, based on the total slurry weight. A portion of the TER–60 slurry was wet ground to pass through a 200-mesh screen (U.S. Standard); this latter slurry is designated as TER–200 in Table V below. Several 188 milliliter samples or portions or the TER–60 slurry and the TER–200 slurry were transferred volumetrically to separate beakers.

The filtration rates of the uranium ore slime or slurry (TER–60 and TER–200) as the control and with poly(ethylene oxide) were determined in accordance with the following procedure. To 188 milliliters of the uranium ore slime (control) there was added dropwise 62 milliliters of distilled water over a period of two minutes. During the two-minute addition period and for two minutes thereafter, the slurry was stirred at 1750 r.p.m. (Fisher Fultork Labmotor, with four-blade stainless steel shafted propeller). The resulting conditioned slurry was then transferred to a filtration apparatus comprised of a 250 milliliter graduated cylinder, a 9 centimeter Büchner funnel covered with a Whatman No. 40 filter paper, and an adapter to which a vacuum source was attached. During the filtration of the slurry samples, the vacuum on the Büchner funnel was 40 mm. of Hg. The period of time to collect 150 milliliters of filtrate was converted to filtration rate expressed as milliliters/minute. The influence of varying amounts of poly(ethylene oxide) on the filtration rates of several slurry samples was also ascertained. The poly(ethylene oxide) addition to the slurry samples was accomplished by diluting measured quantities of a 0.25 weight percent aqueous solution of poly(ethylene oxide) with sufficient water to make a total volume of 62 milliliters, which latter amount was then added to the 188 milliliter slurry samples. Thus, the total volume of slurry samples, whether the control or with poly(ethylene oxide), was 250 milliliters in all the runs. The results and pertinent data are set forth in Table V below.

---

[7] Ground to minus 60 mesh, U.S. Standard Sieve.

Table V

FILTRATION RATES OF ACID LEACHED TER [1] URANIUM ORES

| Run No. | Ore designation | Poly(ethylene oxide), weight percent [2] | Filtration rate, milliliters/minute |
|---|---|---|---|
| 1 | TER-60 [3] | None | 26.1 |
| 2 | TER-60 [3] | 0.02% polymer No. 12 | 181 |
| 3 | TER-60 [3] | 0.05% polymer No. 12 | 375 |
| 4 | TER-60 [3] | 0.10% polymer No. 12 | 750 |
| 5 | TER-60 [3] | 0.05% polymer No. 34 | 283 |
| 6 | TER-200 [4] | None | 12.7 |
| 7 | TER-200 [4] | 0.05% polymer No. 12 | 165 |

[1] Uranium ore designated as Trace Elements, Rich.
[2] Weight percent of polymer, based on weight of total solids in slurry.
[3] Particle size comprising slurry, minus 60 mesh, U.S. Standard Sieve.
[4] Particle size comprising slurry, minus 200 mesh, U.S. Standard Sieve.

It is pointed out that 0.05 weight percent, based on the weight of total slurry solids, of a conventional coagulant, i.e., a high molecular weight acrylamide polymer, added to the TER-60 [3] slurry gave a filtration rate of 88 milliliters/minute. Increasing the addition of the acrylamide polymer to 0.20 weight percent gave a filtration rate of 224 milliliters/minute. It is obvious from Runs No. 2 and No. 4 of Table V that smaller dosages of the poly(ethylene oxide) coagulant gave vastly superior results.

The conventional coagulant employed in the preceding paragraph can be characterized as a high molecular weight polymer hydrolyte having from about 0.8 to about 10 percent of the amide groups of said polymer replaced by carboxyl groups and further characterized by a viscosity of at least 4 centipoises for an aqueous 0.5 percent by weight solution of the polymer hydrolyte. The expression "acrylamide polymer hydrolyte" is inclusive of hydrolytes of the homopolymer of acrylamide and also of hydrolytes of water-soluble copolymers of acrylamide with up to about 15 percent by weight of other suitable monomers such as alkyl esters of acrylic acid and methacrylic acid, methacrylamide, styrene, vinyl acetate, acrylonitrile, methacrylonitrile, vinyl alkyl ethers, and vinyl and vinylidene chloride. In determining the viscosity set forth in the above definition, a 0.5 percent by weight solution of the polymer hydrolyte in distilled water is adjusted to a pH of 3.0 to 3.5 and a temperature of 21.5° C. and the viscosity is determined with an Ostwald viscosimeter.

EXAMPLE 6

A Low Grade Trace Elements uranium ore, ground to a minus 60 mesh (U.S. Standard Sieve), was subjected to the procedure and technique outlined in Example 5 supra. The ore slurry had a pH of 1.4 and a solids content of 10 weight percent, based on the total slurry weight. It is pointed out that a portion of the ore slurry was not wet ground to a minus 200 mesh as is the case in Example 5. The pertinent data and results are set forth in Table VI below.

Table VI

FILTRATION RATES OF ACID LEACHED TELG [1] URANIUM ORES

| Run No. | Ore designation | Poly(ethylene oxide), weight percent [2] | Filtration rate, milliliters/minute |
|---|---|---|---|
| 1 | TELG-60 [3] | None | 115 |
| 2 | TELG-60 [3] | 0.05% polymer No. 12 | 375 |
| 3 | TELG-60 [3] | 0.05% polymer No. 34 | 360 |

[1] Uranium ore designated as Trace Elements, Low Grade.
[2] Weight percent of polymer, based on total weight of solids in slurry
[3] Particle size comprising slurry, minus 60 mesh, U.S. Standard Sieve.

EXAMPLE 7

A uranium ore designated as Blue Ore, ground to a minus 60 mesh (U.S. Standard Sieve), was subjected to

[8] Slurry of uranium ore designated as Trace Elements, Low Grade, ground to a minus 60 mesh, U.S. Standard Sieve.

the procedure and technique outlined in Example 5 supra. The ore slurry had a pH of 0.7 and a solids content of 12 weight percent, based on the total slurry weight. It is again pointed out that a portion of the ore slurry was not wet ground to a minus 200 mesh as is the case in Example 5. The pertinent data and results are set forth in Table VII below.

Table VII

FILTRATION RATES OF ACID LEACHED BLUE ORE [1]

| Run No. | Ore designation | Coagulant | Coagulant dosage, weight percent [2] | Filtration rate, milliliters/minute |
|---|---|---|---|---|
| 1 | Blue ore | None | None | 18 |
| 2 | do | Poly(ethylene oxide) No. 12 | 0.05 | 224 |
| 3 | do | Poly(ethylene oxide) No. 34 | 0.05 | 129 |
| 4 | do | Acrylamide polymer [3] | 0.05 | 90 |

[1] Uranium ore from the Colorado Plateau.
[2] Weight percent coagulant, based on weight of total solids in slurry.
[3] Identical to acrylamide polymer described in Example 5 supra.

EXAMPLE 8

A uranium ore designated as Uravan Ore, 75 weight percent of which was ground to a minus 60 mesh (U.S. Standard Sieve), was subjected to the procedure and technique outlined in Example 5 supra with the following exceptions, namely (1) 129 milliliters of sulfuric acid instead of 99 milliliters were employed, and (2) the acidified ore was admixed with 356 milliliters of water which contained 21.3 grams of sodium chlorate. The ore slurry had a pH of 0.7, and a solids content of 8.1 weight percent, based on the total slurry weight. It is also pointed out that a portion of the ore slurry was not wet ground to a minus 200 mesh as is the case in Example 5. The ore slurry was tested in 250 milliliter samples or portions. The pertinent data and results are set forth in Table VIII below.

Table VIII

FILTRATION RATES OF ACID LEACHED URAVAN ORE

| Run No. | Ore designation | Coagulant | Coagulant dosage, weight percent [2] | Filtration rate, milliliters/minute |
|---|---|---|---|---|
| 1 | Uravan ore | None | None | 18.4 |
| 2 | do | Poly(ethylene oxide) No. 12 | 0.05 | 100 |
| 3 | do | do | 0.10 | 200 |
| 4 | do | Poly(ethylene oxide) No. 34 | 0.05 | 75 |
| 5 | do | Acrylamide polymer [3] | 0.05 | 75 |
| 6 | do | do [3] | 0.10 | 128 |

[1] Uranium ore from the Colorado Plateau.
[2] Weight percent coagulant, based on weight of total solids in slurry.
[3] Identical to acrylamide polymer described in Example 5 supra.

EXAMPLE 9

Three clay minerals, namely (a) T.A.T. Bentonite,[9] (b) kaolin,[10] and (c) Baroco Clay,[11] were leached with sulfuric acid in the manner set forth in Example 5 supra. These resulting leached slurries were dilute with water so as to contain in each instance 5.0 weight percent solids, based on the total slurry weight. The T.A.T Bentonite slurry had a pH of 2.6; the kaolin slurry had a pH of 1.9; and the Baroco Clay slurry had a pH of 2.1. Various samples or portions of the above three slurries were then

[9] Tamm's Silica Company; predominantly sodium bentonite; minus 200 mesh.
[10] Fisher Scientific Company; Fisher Chemical Index, copyright 1954, Catalog No. K-3; minus 200 mesh.
[11] Baroid Company; a Texas Clay predominantly calcium montmorillonite with nontronite as an impurity; minus 60 mesh.

prepared and to these samples varying concentrations of poly(ethylene oxide) were added in the manner set forth in Example 5 supra. Finally, the filtration rates, expressed as milliliters/minute, of the samples were ascertained in accordance with the apparatus and technique discussed in Example 5 supra. The poly(ethylene oxide) employed as the coagulant was prepared by the heptane suspension polymerization of ethylene oxide in the presence of calcium amide catalyst and had a 1.0 weight percent aqueous bulk viscosity of 7,000 centipoises at 25° C. The polymer was added as a 0.25 weight percent aqueous solution. The results and pertinent data are set forth in Table IX below.

*Table IX*

FILTRATION RATES OF ACID LEACHED CLAY MINERALS

| Run No. | Clay designation | Poly(ethylene oxide), weight percent [1] | Filtration rate, milliliters/minute |
|---|---|---|---|
| 1 | T.A.T. Bentonite [2] | None | 4.3 |
| 2 | do.[2] | 0.05 | 23.4 |
| 3 | do.[2] | 0.10 | 250 |
| 4 | Baroco clay [3] | None | 214 |
| 5 | do.[3] | 0.05 | 283 |
| 6 | do.[3] | 0.10 | 300 |
| 7 | do.[3] | 0.20 | 300 |
| 8 | Kaolin | None | 36.3 |
| 9 | do | 0.05 | 41.7 |
| 10 | do | 0.10 | 50.0 |

[1] Weight percent poly(ethylene oxide), based on the weight of total solids in slurry.
[2] Predominantly sodium bentonite.
[3] Texas Clay predominantly calcium montmorillonite with nontronite as an impurity.

These three clay minerals, i.e., kaolin, sodium bentonite, and calcium montmorillonite, when subjected to the leaching procedure used for uranium-containing ores exhibit markedly improved filter rates upon the addition of poly(ethylene oxide) to the resulting slurries containing same. Such clay minerals and other clay minerals, therefore, when present in uranium-containing ores would be expected to respond equally as well to the poly(ethylene oxide) treatment. It has been observed that a neutral uranium-containing ore slurry, i.e., an unleached slurry, and an acidic or basic leached uranium-containing ore slurry are both amenable to coagulation or flocculation by treatment (or addition thereto) of poly(ethylene oxide).

EXAMPLE 10

Uravan Ore [12] (150 grams) admixed with 2850 grams of distilled water was agitated with a Model L Lightnin Mixer for a period of 30 minutes. The resulting slurry contained 5.0 weight percent solids, based on the total slurry weight. A second slurry was prepared using an equal amount of T.A.T. Bentonite [13] in place of the Uravan Ore with agitation being effected as above. The second slurry also contained 5.0 weight percent solids, based on the total slurry weight. Various samples of the above two slurries were combined in varying proportions to give the slurry compositions indicated in Table X below. Filtration rate tests on the individually combined slurry samples were conducted in the manner described in Example 5 supra. The poly(ethylene oxide) employed as the coagulant was prepared by the heptane suspension polymerization of ethylene oxide in the presence of calcium amide catalyst; a 1.0 weight percent aqueous bulk viscosity of the polymer was 7,000 centipoises at 25° C. The results and pertinent data are set forth in Table X below.

[12] Uranium-containing ore from the Colorado Plateau; this ore identical to that employed in Example 8 supra.
[13] Tamm's Silica Company; predominantly sodium bentonite; minus 200 mesh.

*Table X*

FILTRATION RATES OF URAVAN ORE-SODIUM [1] BENTONITE [2] COMPOSITIONS

| Run No. | Slurry composition,[3] percent by weight | | Poly(ethylene oxide), weight percent [4] | Filtration rate, milliliters/minute |
|---|---|---|---|---|
| | Uravan ore | Sodium bentonite | | |
| 1 | 100 | 0 | None | 243 |
| 2 | 90 | 10 | None | 16.8 |
| 3 | 80 | 20 | None | 7.2 |
| 4 | 70 | 30 | None | 5.0 |
| 5 | 60 | 40 | None | 1.2 |
| 6 | 0 | 100 | None | 0.4 |
| 7 | 100 | 0 | 0.05 | 353 |
| 8 | 90 | 10 | 0.05 | 562 |
| 9 | 80 | 20 | 0.05 | 243 |
| 10 | 80 | 20 | 0.10 | 564 |
| 11 | 70 | 30 | 0.05 | 11.7 |
| 12 | 70 | 30 | 0.167 | 530 |
| 13 | 60 | 40 | 0.05 | 3.8 |
| 14 | 60 | 40 | 0.20 | 47.1 |
| 15 | 0 | 100 | 0.50 | 1.82 |

[1] Uranium ore from Colorado Plateau.
[2] Tamm's Silica Company; T.A.T. Bentonite.
[3] The total slurry solids was 5 weight percent. The various compositions were obtained by mixing the appropriate quantities of the Uravan ore slurry and the clay slurry as indicated.
[4] Weight percent poly(ethylene oxide), based on weight of total solids in slurry.

The data in Table X disclose the drastic effect on the filtration rates caused by increasing the relative amounts of the sodium bentonite clay in the untreated slurries. With slurries containing as much as 30 weight percent sodium bentonite, the vastly superior results obtained by poly(ethylene oxide) addition are manifest. In all cases, the filtration rate performance was improved by employing poly(ethylene oxide) as the coagulant.

EXAMPLE 11

Very finely-divided acid leached halloysite, dispersed in a quantity of water so as to give a slurry or suspension having a pH of 2.9 and a solids concentration of 13.3 weight percent (based on the slurry weight), was divided into several 50 milliliter portions or samples. To various samples varying concentrations of poly(ethylene oxide) were added dropwise and agitated for 2 minutes with a wide blade paddle-type stirrer attached to a Fisher Fultork Labmotor operating at 100 r.p.m. These conditioned slurries were then filtered on a 5.5 centimeter Büchner funnel fitted with a Whatman No. 40 filter paper under 40 milliliters of Hg pressure. The filtrate collected over a period of two minutes was converted to filtration rate expressed as milliliters/minute. The poly(ethylene oxide) employed as the coagulant was prepared by the solution polymerization of ethylene oxide in the presence of calcium carbonate catalyst and had a reduced viscosity of 10.4. This polymer was employed as a 0.25 weight percent aqueous solution in this example. The results and pertinent data are set forth in Table XI below.

*Table XI*

EFFECT OF POLY(ETHYLENE OXIDE) ON COAGULATION OF SLURRY CONTAINING 13.3 WEIGHT PERCENT ACID LEACHED HALLOYSITE

| Run No. | Poly(ethylene oxide), weight percent [1] | pH of slurry | Filtration rate, milliliters/minute |
|---|---|---|---|
| 1 | None | 2.9 | 5.0 |
| 2 | 0.225 | 2.9 | 14.0 |
| 3 | 0.330 | 2.9 | 109.0 |
| 4 | 0.450 | 2.9 | 192.5 |
| 5 | 0.570 | 2.9 | 70.0 |

[1] Weight percent poly(ethylene oxide), based on weight of total solids in slurry.

EXAMPLE 12

Very finely-divided sodium bentonite [14] (440 grams) was added to 3920 grams of distilled water containing 40 grams of 96 percent sulfuric acid having a specific gravity of 1.84. This solid-liquid admixture was stirred for a period of two hours with a Model L Lightnin Mixer operating at full speed, followed by a 24-hour storage period of said admixture. The resulting slurry or suspension had a pH of 1.6 and a solids concentration of 10.0 weight percent (based on the slurry weight). The slurry was subsequently divided into several 200 milliliter portions or samples. Varying concentrations of two different grades of poly(ethylene oxide) were added to various slurry samples and the procedure set forth in Example 11 supra was repeated except an 11.0 centimeter Büchner funnel was employed. Both grades of the poly(ethylene oxide) employed were prepared by solution polymerization of ethylene oxide in the presence of calcium carbonate catalyst. One grade had a reduced viscosity of 10.4, the other had a reduced viscosity of 5.2. The polymer was employed as a 0.25 weight percent aqueous solution in all of the runs. The results and pertinent data are set forth in Table XII below.

Table XII

EFFECT OF POLY(ETHYLENE OXIDE) ON COAGULATION OF SLURRY CONTAINING 10.0 WEIGHT PERCENT ACIDIFIED SODIUM BENTONITE

| Run No. | Poly(ethylene oxide), weight percent [1] | pH of slurry | Filtration rate, milliliters/minute |
|---|---|---|---|
| 1 | None | 1.6 | 11.5 |
| 2 | [2] 0.90 | 1.6 | 45.5 |
| 3 | [2] 1.00 | 1.6 | 64.0 |
| 4 | [2] 1.20 | 1.6 | 172.7 |
| 5 | [3] 0.80 | 1.6 | 21.0 |
| 6 | [3] 1.20 | 1.6 | 65.0 |

[1] Weight percent poly(ethylene oxide), based on weight of total solids in slurry.
[2] Poly(ethylene oxide) having a reduced viscosity of 10.4.
[3] Poly(ethylene oxide) having a reduced viscosity of 5.2.

EXAMPLE 13

A slurry containing kaolin [15] (minus 200 mesh, U.S. Standard Sieve) was prepared in the manner outlined in Example 12 supra employing the same quantities of materials and the same technique. The resulting slurry had a pH of 1.6 and a solids concentration of 10.0 weight percent (based on the slurry weight). Several 200 milliliter samples or portions were then prepared and varying concentrations of the two grades of poly(ethylene oxide) employed in Example 12 were added thereto. The results and pertinent data are set forth in Table XIII below.

Table XIII

EFFECT OF POLY(ETHYLENE OXIDE) ON COAGULATION OF SLURRY CONTAINING 10.0 WEIGHT PERCENT ACIDIFIED KAOLIN

| Run No. | Poly(ethylene oxide), weight percent [1] | pH of slurry | Filtration rate, milliliters/minute |
|---|---|---|---|
| 1 | None | 1.6 | 25.5 |
| 2 | [2] 0.25 | 1.6 | 32.5 |
| 3 | [2] 0.50 | 1.6 | 93.0 |
| 4 | [2] 0.10 | 1.6 | 264.0 |
| 5 | [3] 0.05 | 1.6 | 34.0 |
| 6 | [3] 0.10 | 1.6 | 73.5 |

[1] Weight percent poly(ethylene oxide), based on the weight of total solids in slurry.
[2] Poly(ethylene oxide) having a reduced viscosity of 10.4.
[3] Poly(ethylene oxide) having a reduced viscosity of 5.2.

[14] Particle size of minus 200 mesh, U.S. Standard Sieve.
[15] Obtained from Fisher Scientific Company, Pittsburgh, Pennsylvania, Fisher Chemical Index, copyright 1954, Catalog No. K-3.

EXAMPLE 14

A 600-gram sample of Uravan Ore [16] ground to pass a 60-mesh U.S. Standard Sieve was subjected to a conventional alkaline leach procedure as follows. The ore sample was added to an aqueous solution comprised of 558 grams of water, 30 grams of sodium carbonate, and 12 grams of sodium bicarbonate. The resulting liquid-solids admixture was heated at 90° C. with stirring (Model L Lightnin Mixer) for 6 hours. Make-up water was added intermittently throughout the leaching operation to compensate for evaporation losses. After this period, the slurry was cooled to room temperature and diluted with 600 milliliters of water (containing sufficient sodium carbonate to give said water a pH of about 10.5). The diluted slurry having a pH of 10.0 and containing 33 weight percent solids was used in the sedimentation and filtration tests reported in Table XIV below. The conditioning procedure used for the coagulation was similar to that described in Example 5 with the exceptions that are noted below. Stirring during the 4-minute conditioning period was performed either with the Fisher Fultork Labmotor and shafted propeller at 1750 r.p.m., or at 350 r.p.m. with a wide paddle-type stirrer. The conditioned slurry was transferred to a 250-milliliter graduated cylinder and the time required for the solids-supernatant liquid interface to settle a distance of 7 centimeters was observed. These results are expressed as the sedimentation index, which is defined as the average time in seconds for the interface to settle one centimeter. The filtration rate of said slurry was then determined by the method described in Example 5. The results and pertinent data are set forth in Table XIV below.

Table XIV

FILTRATION AND SEDIMENTATION RATES OF A CARBONATE LEACHED URAVAN ORE [1]

| Run No. | Coagulant | Coagulant dosage, percent on solids | Stirring rate during conditioning, revolutions/minute | Sedimentation index,[2] seconds/centimeter | Filtration rate, milliliters/minute |
|---|---|---|---|---|---|
| 1 | None | None | 1,750 | 1,655 | 10.0 |
| 2 | Poly(ethylene oxide) No. 12 [3] | 0.005 | 1,750 | 621 | 17.6 |
| 3 | do [3] | 0.010 | 1,750 | 116 | 42.9 |
| 4 | do [3] | 0.050 | 1,750 | 3.6 | 375 |
| 5 | Acrylamide Polymer [4] | 0.005 | 1,750 | 29.0 | [5] 22.5 |
| 6 | do [4] | 0.010 | 1,750 | 21.0 | [5] 32.1 |
| 7 | do [4] | 0.050 | 1,750 | 7.1 | 200 |
| 8 | Poly(ethylene oxide) No. 12 | 0.005 | 350 | 2.1 | 257 |
| 9 | do | 0.010 | 350 | 0.69 | 454 |
| 10 | do | 0.025 | 350 | 1.10 | 360 |
| 11 | Acrylamide polymer | 0.005 | 350 | 41.3 | 29.1 |
| 12 | do | 0.010 | 350 | 18.6 | 29.1 |
| 13 | do | 0.025 | 350 | 0.69 | 214 |

[1] Uranium-containing ore from the Colorado Plateau.
[2] A low sedimentation index is indicative of very rapid sedimentation.
[3] Identical to ethylene oxide polymer described in discussion preceding Example 5.
[4] Identical to acrylamide polymer described in Example 5.
[5] Very low floc strength.

EXAMPLE 15

A 600-gram sample of Blue Ore [17] was carbonate leached in accordance with the procedure described in Example 14. The leached product was diluted with water to give a slurry having a solids concentration of 14.7 weight percent and a pH of 10.1. The filtration and sedimentation rates of this slurry were determined as in Example 14 supra using the 350 r.p.m. stirring rate procedure. Results are summarized in Table XV below.

[16] Same uranium-containing ore described in Example 8.
[17] Same uranium-containing ore described in Example 7.

Table XV

FILTRATION AND SEDIMENTATION RATES OF A CARBONATE LEACHED BLUE ORE

| Run No. | Coagulant | Coagulant dosage, percent on solids | Stirring rate during conditioning, revolutions/minute | Sedimentation index, seconds/centimeter | Filtration rate, milliliters/minute |
|---|---|---|---|---|---|
| 1 | None | None | 1,750 | 1,396 | 2.4 |
| 2 | Poly(ethylene oxide) No. 12.[1] | 0.005 | 1,750 | 24.8 | 40.0 |
| 3 | ----do.[1] | 0.0075 | 1,750 | 1.4 | 243 |
| 4 | ----do.[1] | 0.010 | 1,750 | 0.55 | 600 |
| 5 | Acrylamide polymer [2] | 0.010 | 1,750 | 844 | 1.7 |
| 6 | ----do.[2] | 0.025 | 1,750 | 24.1 | 2.3 |
| 7 | ----do.[2] | 0.050 | 1,750 | 53.8 | 2.2 |

[1] Identical to ethylene oxide polymer described in discussion preceding Example 5.
[2] Identical to acrylamide polymer described in Example 5.

EXAMPLE 16

A sample of high lime content uranium ore (Mesa Top Ore, Ambrosia Lake, Grants, New Mexico) was carbonate leached in accordance with the procedure described in Example 14 supra. The leached product was diluted with water to give a slurry having a solids concentration of 10.45 weight percent and a pH of 10.1. The filtration and sedimentation rates of this slurry were determined as in Example 14, using the 1750 r.p.m. stirring rate procedure. The results and pertinent data are set forth in Table XVI below.

Table XVI

FILTRATION AND SEDIMENTATION RATES OF CARBONATE LEACHED MESA TOP ORE [1]

| Run No. | Coagulant | Coagulant dosage, percent on solids | Stirring rate during conditioning, revolutions/minute | Sedimentation index, seconds/centimeter | Filtration rate, milliliters/minute |
|---|---|---|---|---|---|
| 1 | None | None | 1,750 | 160 | 12.9 |
| 2 | Poly(ethylene oxide) No. 12.[2] | 0.05 | 1,750 | 17.3 | 60 |
| 3 | ----do.[2] | 0.10 | 1,750 | 3.3 | 167 |
| 4 | ----do.[2] | 0.20 | 1,750 | .85 | 214 |
| 5 | Acrylamide polymer [3] | 0.10 | 1,750 | 37.4 | 19.7 |
| 6 | ----do.[3] | 0.20 | 1,750 | 3.1 | 70.4 |

[1] Uranium ore from Ambrosia Lake, Grants, New Mexico.
[2] Identical to ethylene oxide polymer described in discussion preceding Example 5.
[3] Identical to acrylamide polymer described in Example 5.

EXAMPLE 17

A 5.0 weight percent Baroco [18] clay slurry was prepared by adding 150 grams of said clay to 2850 grams of water, mixing for one hour with a Model L Lightnin Mixer operating at full speed, and aging for 24 hours before conducting the tests to follow. To several 100 milliliter portions of the clay slurry in 400 milliliter beakers there were added the indicated dosages of poly(ethylene oxide) and acrylamide polymer coagulants made up to a total volume of 55 milliliters with water. The coagulant addition was made dropwise over a period of two minutes while stirring at 1750 r.p.m. with the Fisher Fultork Labmotor. The stirring was continued for an additional 2-minute period after the addition was complete. In some of the runs, the total stirring period was lengthened to 8 minutes. These conditioned slurries were filtered through a 5.5 centimeter Büchner funnel fitted with a Whatman No. 40 filter paper under 40 mm. of Hg pressure. The time in seconds to collect 50 milliliters of filtrate is given in Table XVIII below as a measure of the coagulant efficiency. The poly(ethylene oxide), prior to dilution with water to 55 milliliters, was in the form of a 0.1 weight percent aqueous solution which had been stirred for a period of 5 minutes with a Model L Lightnin Mixer (at full speed), followed by sealing the container containing same and rolled on a roll mill for 19 hours. The results and pertinent data are set forth in Table XVII below.

Table XVII

| Run No. | Coagulant designation | Coagulant, weight percent [1] | Slurry conditioned for— 4 minutes | Slurry conditioned for— 8 minutes | Time in seconds to filter 50 milliliters |
|---|---|---|---|---|---|
| 1 | None | (a) | X | ---- | 1,575 |
| 2 | PEO [2] | 0.025 | X | ---- | 120 |
| 3 | PEO [2] | 0.050 | X | ---- | 44 |
| 4 | PEO [2] | 0.050 | ---- | X | 124 |
| 5 | PEO [2] | 0.100 | X | ---- | 5 |
| 6 | PEO [3] | 0.100 | ---- | X | 13 |
| 7 | PEO [3] | 0.050 | X | ---- | 21 |
| 8 | PEO [3] | 0.050 | ---- | X | 224 |
| 9 | Acrylamide polymer [4] | 0.300 | X | ---- | 34 |
| 10 | ----do.[4] | 0.300 | ---- | X | 44 |
| 11 | ----do.[4] | 0.300 | ---- | X | 780 |

[1] Weight percent coagulant, based on total weight of solids in slurry. Coagulant was dissolved in sufficient water to make 55 milliliters which amount of solution was added to individual slurry samples.
[2] Poly(ethylene oxide) prepared by suspension polymerization with $Ca(NH_2)_2$ catalyst; reduced viscosity of polymer was 37.5.
[3] Preparation same as footnote 2. Poly(ethylene oxide) was a reduced viscosity of 63.
[4] Identical to acrylamide polymer described in Example 5 supra.
(a) 55 ml. of $H_2O$.

EXAMPLE 18

Sodium bentonite [19] was added to a quantity of distilled water under agitation by a Model L Lightnin Mixer. Agitation was continued for a period of 30 minutes, after which time the resulting slurry was stored at room temperature for 24 hours. This slurry contained 5.0 weight percent solids, based on the total slurry weight. The slurry was then divided into several 100 milliliter samples or portions and to each sample there was added (1) a single reagent, or (2) a mixture of reagents, or (3) two reagents added individually. In each run, the slurry sample was stirred for a period of 2 minutes following the addition of a single reagent or a mixture of reagents. When more than one reagent was added singly, the two-minute stirring period was repeated after each addition. Stirring was effected with a wide blade paddle-type stirrer attached to a Fisher Fultork Labmotor operating at 100 r.p.m. These conditioned slurry samples were than filtered through a 5.5 centimeter Büchner funnel fitted with a Whatman No. 40 filter paper under 40 milliliters of Hg pressure. The milliliters of filtrate collected over a period of 30 seconds is a measure or an indication of the coagulant efficiency; i.e., the greater the volume of filtrate, the more efficient the coagulant. The concentration of the sulfuric acid employed was 96 percent and possessed a specific gravity of 1.84. The concentration of the hydrochloric acid employed was 36 percent and possessed a specific gravity of 1.178–1.188. The sodium chloride was employed as a saturated aqueous solution containing about 26 weight percent sodium chloride. The poly(ethylene oxide) was employed as a 0.1 weight percent aqueous solution; this polymer was prepared by polymerizing ethylene oxide in the presence of calcium carbonate catalyst and had a reduced viscosity of 8.9. The results and pertinent data are set forth in Table XVIII below.

[18] Obtained from Baroid Company; a Texas clay predominantly calcium montmorillonite with nontronite as an impurity; ground to minus 60 mesh, U.S. Standard Sieve.

[19] Obtained from Tamm's Silica Company; T.A.T. Bentonite, predominantly sodium bentonite; ground to minus 200 mesh, U.S. Standard Sieve.

Table XVIII

| Run No. | First reagent | Weight percent [1] | Second reagent | Weight percent [1] | Milliliters of filtrate in 30 seconds |
|---|---|---|---|---|---|
| 1 | Water [2] | | | | 1 |
| 2 | NaCl | 10.4 | PEO [3] | 1.6 | 2 |
| 3 | NaCl | 52 | PEO | 1.6 | 3 |
| 4 | NaCl | 104 | PEO | 1.6 | 5 |
| 5 | NaCl | 130 | PEO | 1.6 | 6 |
| 6 | NaCl | 104 | | | 5 |
| 7 | PEO | 2.0 | NaCl | 26 | 18 |
| 8 | PEO | 2.0 | NaCl | 52 | 29 |
| 9 | PEO | 2.0 | NaCl | 78 | 53 |
| 10 | PEO | 2.0 | NaCl | 104 | 70 |
| 11 | PEO | 2.0 | NaCl | 156 | 86 |
| 12 | PEO | 1.0 | NaCl | 104 | 63 |
| 13 | PEO | 0.5 | NaCl | 104 | 59 |
| 14 | PEO | 0.25 | NaCl | 104 | 30 |
| 15 | PEO | 0.13 | NaCl | 104 | 16 |
| 16 | PEO [4] | 1.6 | NaCl [4] | 52 | 5 |
| 17 | PEO [4] | 2.0 | NaCl [4] | 104 | 4 |
| 18 | Acrylamide polymer [5] | 1.0 | NaCl | 104 | 6 |
| 19 | $H_2SO_4$ | 4 | PEO | 1.6 | 5 |
| 20 | $H_2SO_4$ | 20 | PEO | 1.6 | 4 |
| 21 | $H_2SO_4$ [6] | 20 | PEO | 1.6 | 4 |
| 22 | $H_2SO_4$ | 192 | PEO | 1.5 | 5 |
| 23 | $H_2SO_4$ | 210 | PEO | 1.5 | 7 |
| 24 | $H_2SO_4$ [4] | 210 | PEO [4] | 1.5 | 5 |
| 25 | $H_2SO_4$ [4] | 287 | PEO [4] | 1.5 | 8 |
| 26 | HCl | 3.0 | PEO | 1.5 | 5 |
| 27 | HCl | 70 | PEO | 1.5 | 5 |
| 28 | HCl | 140 | PEO | 1.5 | 22 |
| 29 | HCl | 210 | PEO | 1.5 | 69 |
| 30 | HCl | 210 | PEO | 2.0 | 76 |
| 31 | HCl | 210 | PEO | 1.0 | 4 |
| 32 | HCl | 210 | PEO | 0.5 | 20 |
| 33 | PEO | 1.5 | HCl | 210 | 77 |
| 34 | HCl [4] | 210 | PEO [4] | 1.5 | 69 |
| 35 | HCl | 210 | | | 12 |

[1] Weight percent reagent, based on weight of solids in slurry.
[2] Quantity of water added was 8 milliliters.
[3] PEO throughout this table means poly(ethylene oxide).
[4] Added as a mixture of both reagents.
[5] Identical to acrylamide polymer described in Example 5 supra.
[6] Upon addition of acid, the slurry was stored at room temperature for one hour.

EXAMPLE 19

A 6.68 weight percent Ambrosia Lake Ore[20] slurry was prepared in the identical manner set forth in Example 17. Various 100 milliliter samples or portions of the above slurry were prepared; the manner of adding various concentrations of the coagulants, including the conditioning and filtering the slurry samples, is exactly as set forth in Example 17. The results and pertinent data are set forth in Table XIX below.

Table XIX

| Run No. | Coagulant designation | Coagulant, weight percent [1] | Slurry conditioned for— 4 minutes | Slurry conditioned for— 8 minutes | Time in seconds to filter 50 ml. | Time in seconds to filter 100 ml. |
|---|---|---|---|---|---|---|
| 1 | None | (*) | X | | 1,230 | 2,820 |
| 2 | Poly(ethylene oxide)[2] | 0.1 | X | | 12 | 26 |
| 3 | ----do.[3] | 0.2 | X | | 12 | 20 |
| 4 | ----do.[2] | 0.1 | | X | 45 | 123 |
| 5 | ----do.[2] | 0.2 | | X | 12 | 27 |
| 6 | Acrylamide polymer [3] | 0.1 | X | | 96 | 264 |
| 7 | ----do.[3] | 0.2 | X | | 22 | 72 |
| 8 | ----do.[3] | 0.3 | | X | 99 | 263 |
| 9 | ----do.[3] | 0.6 | | X | 32 | 82 |

[1] Weight percent coagulant, based on total weight of solids in slurry. Coagulant was dissolved in sufficient water to make 55 milliliters which amount of solution was added to individual slurry samples.
[2] Poly(ethylene oxide) prepared by suspension polymerization with $Ca(NH_2)_2$ catalyst; reduced viscosity of polymer was 37.5.
[3] Identical to acrylamide polymer described in Example 5 supra.
* 55 ml. of $H_2O$.

EXAMPLE 20

A typical phosphate slime was prepared from an effluent sample supplied by the International Minerals and Chemicals Corporation, Noralyn Mines Division, Bartow, Florida. This phosphate slime was comprised predominantly of clay solids and finely-divided phosphate rock solids, said slime having a total solids content of 3.3 weight percent. A mineralogical analysis of a typical Florida phosphate slime comprises about 90 weight percent apatite, kaolinite, wavellite and limonite. Authorities exist which hold that the clay content is montmorillonite and/or attapulgite rather than kaolin.

The filtration rate of the said phosphate slime was determined by the procedure described in Example 5. A stirring rate of 120 revolutions per minute was maintained throughout the conditioning period by use of a Fisher Fultork Labmotor equipped with a wide paddle-type stirrer. The dependence of the filtration rate of the conditioned phosphate slime upon the reduced viscosity of the poly(ethylene oxide) solution was demonstrated by the data in Table XX below. A 0.25 weight percent aqueous solution of poly(ethylene oxide) No. 12 was divided into four equal portions. Three of these solutions were subjected to varying periods of high-speed mixing in order to obtain the spread in reduced viscosity values shown in Table XX. Reduced viscosity values were determined at a concentration of 0.100 weight percent aqueous solution of the above-said No. 12 polymer at 30° C. with a Cannon-Fenske viscosimeter. The filtration rate data demonstrate that the flocculation efficiency of the poly(ethylene oxide) solution bears a direct relationship to the reduced viscosity of the poly(ethylene oxide) solution.

Table XX

FILTRATION RATE OF A PHOSPHATE SLIME [1] RELATED TO THE VISCOSITIES OF POLY(ETHYLENE OXIDE) SOLUTIONS

| Run No. | Poly(ethylene oxide) No. 12 [2] | Poly(ethylene oxide), weight percent on solids | Filtration rate, milliliters/minute |
|---|---|---|---|
| 1 | | None | 5.9 |
| 2 | 34.2 | 0.025 | 667 |
| 3 | 34.2 | 0.010 | 71 |
| 4 | 34.2 | 0.005 | 17 |
| 5 | 30.2 | 0.050 | 400 |
| 6 | 30.2 | 0.025 | 272 |
| 7 | 21.8 | 0.050 | 222 |
| 8 | 21.8 | 0.025 | 48 |
| 9 | 18.9 | 0.050 | 67 |
| 10 | 18.9 | 0.025 | 23 |

[1] Sample was supplied by International Minerals and Chemicals Corporation, Noralyn Mines Division, Bartow, Florida. Point of sampling was in immediate vicinity of the plant effluent discharge.
[2] The reduced viscosity of the No. 12 polymer solution was reduced in increments by subjecting the highest viscosity solution to varying periods of high-speed mixing in an Osterizer. Preparation of No. 12 polymer described in discussion preceding Example 5 supra.

EXAMPLE 21

The International Minerals and Chemical Company phosphate slime described in Example 20 supra was conditioned with poly(ethylene oxide) No. 12 according to the procedure described in said Example 20. The conditioned slime samples were transferred to 250-milliliter graduated cylinders and the rate of descent of the slurry-supernatant liquid interface was recorded. At the commencement of each run, the slurry solids were dispersed throughout the cylinder; the solids concentration was 2.48 weight percent in each run. As the solids settled by collective subsidence, the increase in solids concentration of the slurry phase or sediment was calculated by the formula:

$$\frac{\text{Total height of cylinder (18 centimeters)}}{\text{Height of sediment (centimeters)}} \times 2.48 \text{ percent}$$

The sediment levels were observed at various intervals over a period of 20 days. The data shown in Table XXI below demonstrated that the treatment of the phosphate slime samples with poly(ethylene oxide) caused a significant increase in the compaction density of the sediment over that of the untreated slime samples. The results and pertinent data are set forth in Table XXI below.

---

[20] Uranium-containing ore from the Ambrosia Lake region, New Mexico. In addition to the clay mineral constituent the ore contained minor quantities of organic asphaltic particles; ore ground to minus 200 mesh, U.S. Standard Sieve.

EFFECT OF POLY(ETHYLENE OXIDE)[1] ON SEDIMENTATION OF FLORIDA PHOSPHATE SLIME[2]

| Run No. | Poly(ethylene oxide), weight percent[3] | Weight percent, slime solids[4] | Solids concentration of sediment (weight percent) after settling for indicated days | | | | |
|---|---|---|---|---|---|---|---|
| | | | 1 | 6 | 10 | 16 | 20[5] |
| 1 | None | 2.48 | 4.24 | 7.94 | 9.24 | 9.85 | 9.85 |
| 2 | None | 2.48 | 3.62 | 7.38 | 8.86 | 9.55 | 9.70 |
| 3 | 0.005 | 2.48 | 7.30 | 9.13 | 10.00 | 10.18 | 10.34 |
| 4 | 0.005 | 2.48 | 7.22 | 9.26 | 9.84 | 10.18 | 10.34 |
| 5 | 0.025 | 2.48 | 7.66 | 10.00 | 11.29 | 12.40 | 12.65 |
| 6 | 0.025 | 2.48 | 7.47 | 10.00 | 11.29 | 12.18 | 12.65 |

[1] Poly(ethylene oxide) employed is the polymer designated as No. 12 in discussion preceding Example 5 supra.
[2] Same phosphate slime employed in Example 20 supra. Diluted with water to give a solids concentration of 2.48 weight percent.
[3] Weight percent poly(ethylene oxide), based on weight of solids in slurry samples. Same polymer as No. 12 polymer described in discussion preceding Example 5 supra; added as a 0.025 weight percent aqueous solution.
[4] Weight percent of solids, based on total weight of slime or slurry, at the commencement of the runs.
[5] This horizontal row indicates days of settling.

EXAMPLE 22

Synthetic mixtures of phosphate rock (relatively pure apatite) and two clay minerals commonly found in phosphate slimes were prepared by mixing varying quantities of the following solids in an aqueous medium so as to give liquid-solids admixtures containing 5.0 weight percent solids, based on the total slurry weight. The solids were (1) phosphate rock, 31 percent $P_2O_5$, ground to minus 200 mesh; (2) Baroco Clay, predominantly calcium bentonite, ground to minus 200 mesh; and (3) minus 200 mesh attapulgite. These synthetic slimes were then conditioned with poly(ethylene oxide) No. 12 [21] according to the procedure set forth in Example 5 supra, and the filtration rates were likewise determined in the manner outlined in said Example 5. The data is Table XXII below show that the filtration rate of a phosphate rock slurry is decreased by the addition thereto of clay minerals when no poly(ethylene oxide) coagulant is present. However, treatment or addition of poly(ethylene oxide) to the phosphate rock-clay mineral slurries greatly enhance the filtration rates of these slurries. This example demonstrates that the enhanced filtration rates obtained by employing poly(ethylene oxide) to phosphate rock-clay mineral slurries is attributable to the presence of the clay mineral component therein. The results and pertinent data are set forth in Table XXI below.

Table XXII

| Run No. | Phosphate rock, weight percent on total solids | Calcium Bentonite, weight percent on total solids | Attapulgite, weight percent on total solids | Poly(ethylene oxide), weight percent[1] | Filtration rate, milliliters/minute |
|---|---|---|---|---|---|
| 1 | 100 | | | None | [2]180 |
| 2 | 100 | | | 0.050 | [2]200 |
| 3 | 95 | 5 | | 0.050 | [2]334 |
| 4 | 75 | 25 | | 0.050 | [2]500 |
| 5 | 50 | 50 | | None | 31 |
| 6 | 50 | 50 | | 0.050 | [2]500 |
| 7 | 25 | 75 | | 0.050 | [2]375 |
| 8 | 5 | 95 | | 0.050 | [2]200 |
| 9 | | 100 | | None | 10 |
| 10 | | 100 | | 0.050 | 75 |
| 11 | | 100 | | 0.100 | 600 |
| 12 | 95 | | 5 | None | 200 |
| 13 | 95 | | 5 | 0.050 | 430 |
| 14 | 50 | | 50 | None | 71 |
| 15 | 50 | | 50 | 0.050 | 500 |
| 16 | | | 100 | None | 43 |
| 17 | | | 100 | 0.050 | 315 |
| 18 | | | 100 | 0.100 | 546 |

[1] Weight percent poly(ethylene oxide) No. 12, based on weight of total solids in slurry; added as a 0.25 weight percent aqueous solution.
[2] Average of two runs.

[21] Note discussion preceding Example 5 supra.

EXAMPLE 23

A phosphate slime sample containing 6.6 weight percent solids and representative of the plant effluent of the Coronet Phosphate Company, Plant City, Florida, was tested according to the procedure described in Example 5 supra. With said slurry, the effect of calcium chloride on the filtration rate was observed when this salt was used in conjunction with the poly(ethylene oxide) coagulant. In those runs in which calcium chloride was used, said salt was added to the phosphate slime as a 1.0 weight percent aqueous solution and stirred for two minutes at 1750 r.p.m. with the Fisher Fultork Labmotor prior to the conditioning period set out in Example 5 supra. The poly(ethylene oxide) employed is the No. 12 polymer described in the discussion preceding Example 5 supra. The results and pertinent data are set forth in Table XXIII below.

Table XXIII

| Run No. | 1 $CaCl_2$, weight percent[1] | 2 Poly(ethylene oxide), weight percent[1] | Filtration rate, milliliters/minute |
|---|---|---|---|
| 1 | None | None | 5.26 |
| 2 | 0.10 | None | 5.90 |
| 3 | None | 0.20 | 7.70 |
| 4 | None | 0.30 | 9.09 |
| 5 | 0.10 | 0.05 | 7.70 |
| 6 | 0.20 | 0.05 | 8.54 |
| 7 | 0.10 | 0.10 | 25.00 |
| 8 | 0.10 | 0.20 | 133.33 |
| 9 | 0.10 | 0.30 | 400.00 |

[1] Based on weight of solids in slurry. Poly(ethylene oxide) was added as 0.25 weight percent aqueous solution.

Various modifications and ramifications of the instant invention can be practiced in the light of the instant disclosure.

What is claimed is:

1. A method for coagulating solids comprising clay mineral suspended in an aqueous medium which comprises adding to said aqueous medium a coagulating amount of poly(ethylene oxide) which has a reduced viscosity value of a least 1.0 as measured at a concentration of 0.2 gram of said poly(ethylene oxide) in 100 milliliters of acetonitrile at 30° C.

2. The method of claim 1 wherein said poly(ethylene oxide) concentration is in the range of from about 0.0001 to about 5.0 weight percent, based on the weight of clay mineral.

3. The method of claim 1 wherein said poly(ethylene oxide) concentration is in the range of from about 0.0001 to about 2.0 weight percent, based on the weight of clay mineral.

4. The method of claim 1 wherein said poly(ethylene oxide) concentrattion is in the range of from about 0.001 to about 1.0 weight percent, based on the weight of clay mineral.

5. A method for coagulating solids comprising kaolin suspended in an aqueous medium which comprises adding to said aqueous medium a coagulating amount of poly(ethylene oxide) which has a reduced viscosity of at least 1.0 as measured at a concentration of 0.2 gram of said poly(ethylene oxide) in 100 milliliters of acetonitrile at 30° C.

6. A method for coagulating solids comprising montmorillonite suspended in an aqueous medium which comprises adding to said aqueous medium a coagulating amount of poly(ethylene oxide) which has a reduced viscosity of at least 1.0 as measured at a concentration of 0.2 gram of said poly(ethylene oxide) in 100 milliliters of acetonitrile at 30° C.

7. The method of claim 6 wherein said montmorillonite is alkali metal bentonite.

8. The method of claim 6 wherein said montmorillonite is alkaline earth metal bentonite.

9. A method for coagulating solids comprising illite suspended in an aqueous medium which comprises adding to said aqueous medium a coagulating amount of poly(ethylene oxide) which has a reduced viscosity of at least 1.0 as measured at a concentration of 0.2 gram of said poly(ethylene oxide) in 100 milliliters of acetonitrile at 30° C.

10. A method for coagulating solids comprising halloysite suspended in an aqueous medium which comprises adding to said aqueous medium a coagulating amount of poly(ethylene oxide) which has a reduced viscosity of at least 1.0 as measured at a concentration of 0.2 gram of said poly(ethylene oxide) in 100 milliliters of acetonitrile at 30° C.

11. A method for coagulating solids comprising sericite suspended in an aqueous medium which comprises adding to said aqueous medium a coagulating amount of poly(ethylene oxide) which has a reduced viscosity of at least 1.0 as measured at a concentration of 0.2 gram of said poly(ethylene oxide) in 100 milliliters of acetonitrile at 30° C.

12. A method for coagulating solids comprising attapulgite suspended in an aqueous medium which comprises adding to said aqueous medium a coagulating amount of poly(ethylene oxide) which has a reduced viscosity of at least 1.0 as measured at a concentration of 0.2 gram of said poly(ethylene oxide) in 100 milliliters of acetonitrile at 30° C.

13. A method for coagulating solids comprising hectorite suspended in an aqueous medium which comprises adding to said aqueous medium a coagulating amount of poly(ethylene oxide) which has a reduced viscosity of at least 1.0 as measured at a concentration of 0.2 gram of said poly(ethylene oxide) in 100 milliliters of acetonitrile at 30° C.

14. A method of coagulating an aqueous suspension comprising phosphate rock and clay mineral which comprises adding to said suspension a coagulating amount of poly(ethylene oxide) having a reduced viscosity of at least 1.0 as measured at a concentration of 0.2 gram of said poly(ethylene oxide) in 100 milliliters of acetonitrile at 30° C.

15. Thet method of claim 14 wherein said phosphate rock is apatite.

16. The method of claim 14 wherein said clay mineral is kaolinite.

17. The method of claim 14 wherein said clay mineral is montmorillonite.

18. The method of claim 14 wherein said clay mineral is attapulgite.

19. A method for coagulating a phosphate slime which comprises adding to said phosphate slime a coagulating amount of poly(ethylene oxide) having a reduced viscosity of at least 1.0 as measured at a concentration of 0.2 gram of said poly(ethylene oxide) in 100 milliliters of acetonitrile at 30° C.

20. A method for coagulating a phosphate slime containing added extraneous clay mineral which comprises incorporating thereto a coagulating amount of poly(ethylene oxide) having a reduced viscosity of at least 1.0 as measured at a concentration of 0.2 gram of said poly(ethylene oxide) in 100 milliliters of acetonitrile at 30° C.

21. A method for coagulating an aqueous metal-containing ore slurry which comprises adding, to said slurry, a coagulating amount of poly(ethylene oxide) having a reduced viscosity of at least 1.0 as measured at a concentration of 0.2 gram of said poly(ethylene oxide) in 100 milliliters of acetonitrile at 30° C.

22. The process of claim 21 wherein said metal-containing slurry is admixed with a minor quantity of clay mineral.

23. A method for coagulating an aqueous uranium ore slurry which comprises adding to said slurry a coagulating amount of poly(ethylene oxide) having a reduced viscosity of at least 1.0 as measured at a concentration of 0.2 gram of said poly(ethylene oxide) in 100 milliliters of acetonitrile at 30° C.

24. In a process for leaching a uranium-containing ore to solubilize the uranium values in the leaching medium, the improvement which comprises adding to the resulting leached uranium ore slurry a coagulating amount of poly(ethylene oxide) having a reduced viscosity of at least 1.0 as measured at a concentration of 0.2 gram of said poly(ethylene oxide) in 100 milliliters of acetonitrile at 30° C. thereby coagulating the solids content in said slurry.

25. The process of claim 24 wherein said uranium-containing ore is subjected to acidic leach.

26. The process of claim 24 wherein said uranium-containing ore is subjected to a basic leach.

27. The process of claim 24 wherein said uranium-containing ore is admixed with a minor quantity of clay mineral.

28. A process for coagulating an acidified aqueous slurry comprising clay mineral which comprises adding thereto a coagulating amount of poly(ethylene oxide) having a reduced viscosity of at least 1.0 as measured at a concentration of 0.2 gram of said poly(ethylene oxide) in 100 milliliters of acetonitrile at 30° C.

29. A process for coagulating solids comprising clay mineral having a zeta potential approximately no greater than the zeta potential of sodium bentonite which solids are suspended in an aqueous medium, which comprises adding to said aqueous medium a coagulating amount of poly(ethylene oxide) having a reduced viscosity of at least 1.0 as measured at a concentration of 0.2 gram of said poly(ethylene oxide) in 100 milliliters of acetonitrile at 30° C.

30. The process of claim 29 wherein said clay mineral has a zeta potential less than the zeta potential of sodium bentonite.

31. A process for increasing the coagulability of an aqueous suspension comprising clay mineral which comprises adding a member selected from the group consisting of polyvalent metal bentonites, polyvalent metal salts and strong inorganic acids, to said suspension, and subsequently adding thereto a coagulating amount of poly(ethylene oxide) to coagulate the solids content of said suspension, said poly(ethylene oxide) having a reduced viscosity of at least 1.0 as measured at a concentration of 0.2 gram of poly(ethylene oxide) in 100 milliliters of acetonitrile at 30° C.

32. The process of claim 31 wherein said poly(ethylene oxide) is added prior to the addition of said member.

33. A process for clarifying turbid water which owes its turbidity at least in part to clay mineral dispersed therein which comprises adding to said turbid water a coagulating amount of poly(ethylene oxide) having a reduced viscosity of at least 1.0 as measured at a concentration of 0.2 gram of said poly(ethylene oxide) in 100 milliliters of acetonitrile at 30° C. thereby clarifying said turbid water.

34. A process for clarifying turbid water which comprises adding to said turbid water finely-divided clay mineral, and subsequently adding thereto a coagulating amount of poly(ethylene oxide) having a reduced viscosity of at least 1.0 as measured at a concentration of 0.2 gram of said poly(ethylene oxide) in 100 milliliters of acetonitrile at 30° C.

35. The process of claim 34 wherein said clay mineral is sodium bentonite.

36. A method for coagulating solids comprising clay mineral suspended in an aqueous medium which comprises adding to said medium a coagulating amount of poly(ethylene oxide) which has a reduced viscosity of at least about 20 as measured at a concentration of 0.2 gram of said poly(ethylene oxide) in 100 milliliters of acetonitrile at 30° C.

References Cited in the file of this patent

UNITED STATES PATENTS

| | | |
|---|---|---|
| 1,921,378 | Webel | Aug. 8, 1933 |
| 1,976,678 | Wittwer | Oct. 9, 1934 |
| 1,994,328 | Tefft | Mar. 12, 1935 |
| 2,326,395 | Samuel | Aug. 10, 1943 |
| 2,394,083 | Lintz | Feb. 5, 1946 |
| 2,420,340 | Ryznar | May 13, 1947 |
| 2,687,374 | Mowry et al. | Aug. 24, 1954 |
| 2,688,550 | McFarlane | Sept. 7, 1954 |
| 2,728,725 | Gloor | Dec. 27, 1955 |
| 2,740,522 | Aimone et al. | Apr. 3, 1956 |

FOREIGN PATENTS

| | | |
|---|---|---|
| 880,046 | Germany | June 18, 1953 |
| 154,799 | Australia | Jan. 19, 1954 |
| 202,957 | Australia | Oct. 15, 1958 |

OTHER REFERENCES

Rosenbaum et al.: Proceedings of the International Conference on the Peaceful Uses of Atomic Energy, Aug. 8–20, 1955, vol. 8, pages 38–44, United Nations (1956).

Schweitzer: Rubber Chem. and Tech., vol. 13, pages 408–414 (1940).

Kemmer: Chem. Abstracts, vol. 46 (1952), col. 3686.

Dow Diamond, vol. 18, No. 1, March 1954, pages 1–3.

Guillot et al.: "Le Sang," vol. 19, pages 59–61 (1948).